(12) United States Patent
Adhikari et al.

(10) Patent No.: US 8,051,376 B2
(45) Date of Patent: Nov. 1, 2011

(54) CUSTOMIZABLE MUSIC VISUALIZER WITH USER EMPLACED VIDEO EFFECTS ICONS ACTIVATED BY A MUSICALLY DRIVEN SWEEP ARM

(75) Inventors: Suranjit Adhikari, San Diego, CA (US); Eric Hsiao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 408 days.

(21) Appl. No.: 12/378,215

(22) Filed: Feb. 12, 2009

(65) Prior Publication Data

US 2010/0205532 A1 Aug. 12, 2010

(51) Int. Cl.
*G06F 3/16* (2006.01)

(52) U.S. Cl. ........ 715/727; 715/763; 715/835; 708/404; 84/464 R (58) Field of Classification Search .................. 717/105; 715/835; 708/404
See application file for complete search history.

(56) References Cited

U.S. PATENT DOCUMENTS

| | | | |
|---|---|---|---|
| 6,201,769 B1 * | 3/2001 | Lewis | 368/10 |
| 7,913,188 B1 * | 3/2011 | Krenz et al. | 715/834 |
| 2005/0190199 A1 * | 9/2005 | Brown et al. | 345/600 |
| 2005/0211072 A1 * | 9/2005 | Lu et al. | 84/612 |
| 2007/0292832 A1 | 12/2007 | Doyle et al. | |
| 2008/0028918 A1 * | 2/2008 | Latour | 84/610 |

FOREIGN PATENT DOCUMENTS

BG 109383 6/2007

OTHER PUBLICATIONS

"Music Visualizer Protocol," Quartz Composer Tutorials, Aug. 10, 2008.
"Phonviso (Phonature Music Visualizer)," Display Research Library, date unknown.
"Windows Media Player 11 SDK Windows Media Player Custom Visualizations," Microsoft Corporation, 2008.

* cited by examiner

*Primary Examiner* — Kieu Vu
*Assistant Examiner* — James T Durkin
(74) *Attorney, Agent, or Firm* — Miller Patent Services; Jerry A. Miller (57) ABSTRACT

A method for creating a customized music visualization display for a music input involves presenting a user with a plurality of effects icons and a visualizer canvas as a portion of the user interface display. A user places one or more of the visual effects icons on the visualizer canvas. A sweep arm travels in a continuous sweeping motion through an arc and at a speed determined by a musical input and where each effect icon is detected and the effect is displayed when the sweep arm impacts the location of the video effect icon within the visualizer canvas.

31 Claims, 7 Drawing Sheets

CUSTOMIZABLE MUSIC VISUALIZER WITH USER EMPLACED VIDEO EFFECTS ICONS ACTIVATED BY A MUSICALLY DRIVEN SWEEP ARM

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

With the advent of online music and ubiquitous music and video players, audio/music visualizers have become standard features in most software player software suites. The purpose of the music visualizer is to present the user with a beautiful presentation of music coupled with visuals that are synchronized to the music to create a complete experience.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Most visualizers available today achieve their music presentation experience by programming in the various behaviors and sequences as pre-set sequences that may be retrieved when those behaviors and sequences appear in the music being played.

Interactive music visualizers are currently absent from known media players whether on a computer or television platform. The music listening experience has long been thought to be a passive experience. Although this is usually the case, more and more the music listening experience is becoming associated with a creative experience. There are currently no implementations or designs that allow users to create their own visualizers and then synchronize the created effects with an incoming music stream within a single media player framework. Specialized software packages do exist that allow a user to arrange music to preset effects and mix and match those effects to produce an output display. However, these packages are neither user friendly nor easy to use. The visualizer described herein addresses both ease of use and easing the user experience in learning how to create a visualizer experience.

The visualizer described herein presents a new visualizer that is actually created by the user. The proposed visualizer presents a user interface that is symbolic and icon based. There are no pre-set effects tied to particular behaviors and sequences, rather the visualization effects are created through a simple interface with which the user interacts once the user has created a visualizer design. The musical synchronization with the user specified design is handled by the visualizer system. Just as with popular video games such as the commercially available Guitar Hero™ brand video game, or the popularity of scrap booking, users have an overwhelming need to be involved in the creation process. The system described herein allows users to customize their own music visualizer and then to view the results when favorite songs are played and the visualizer system creates and displays the visual presentation.

A customizable music visualizer allows a listener to create various effects and visualizations on a media player. These visualizations which have been created by the user are created without the need for complicated programming or involved interaction. The present disclosure provides exemplary embodiments for a simple user friendly design with symbolic representation of a number of unitary musical based visual effects. The disclosure presents in an exemplary embodiment to a user a circular canvas area in a portion of the User Interface (UI) display. The user may place icons representative of musical based visual effects within the circular area as described by the canvas portion of the UI. The visual effects icons may be selected from a number of icons as displayed in a separate portion of the UI display, distinct from the visualizer canvas portion of the UI display.

In one embodiment the placement and choice of the effects icons determines the nature of the final visualization produced. A combination of different effect objects as represented by the icons placed within the visualizer canvas in cooperation with the icon locations on the visualizer canvas area allows for a large number of differing visual effects. An effect initializer, which in an exemplary embodiment acts as a sweep arm having one terminus placed at the center of the visualizer canvas and the other terminus at the outer edge of the circular canvas and moves clockwise around the entire visualizer canvas area, performs a sweep of the visualizer canvas to determine the identity and location of the effects icons emplaced within the area of the circular canvas. The combination of the visualizer canvas and the effects initializer provide a simple to use interface that overcomes the problems of ease of use and flexibility to create random and truly different visual effects that are inherent in programmed systems.

In an exemplary embodiment, a separate portion of the UI display is configured as a preview window. As effects icons are emplaced in the visualizer canvas the sweep of the effects initializer arm moves around the area of the circular visualizer canvas. As the effects initializer arm comes into contact with each effect icon, the chosen effect represented by the effect icon appears in the preview window. This provides immediate, real-time feedback to a user and allows the reorganization of effects icons to produce the display to the user's satisfaction prior to storing the configuration and running the visualizer in full screen display mode on the display device. In addition, the sweep speed of the effect initializer sweep arm may be controlled, as well as the arc size through which the effect initializer will perform a sweep. These control parameters allow the visualizer to be synchronized with the music to be used for visualization. The arc size and speed, whether using pre-set parameters for initial values or user selected values, are generated by performing a Fast Fourier Transform on the input music. This calculation results in the required size and speed of the circular arc of the effects initializer so as to synchronize the effects to be displayed with the music chosen for visualization.

The initiation of the effects in an exemplary embodiment is dependent upon the segmentation of the visualizer canvas into a plurality of frequency ranges, each segment of which represents a portion of the visualizer canvas in which effects may be emplaced. By way of example only the portion of the visualizer canvas through which the sweep arm of the effects initializer moves may be segmented into 32 or 64 segments, each segment of which represents a frequency range. Thus, there are segments representing very low frequencies up through very high frequencies, although the range of frequencies is typically limited to the range that represents the human hearing range, typically from a bottom frequency of 20 Hz up to a top frequency of 20 kHz. Effects that are emplaced within the visualizer canvas will be placed within one or more segments of the visualizer canvas. As a beat of the input music is detected in one frequency range, the effects emplaced within those segments representing that frequency range are activated to generate the effect thus emplaced. The detection of various frequency ranges for each beat of the input music will thus be activated to generate a unique visualization animation based upon the emplacement of the effects within the visualizer canvas.

Figure 1:
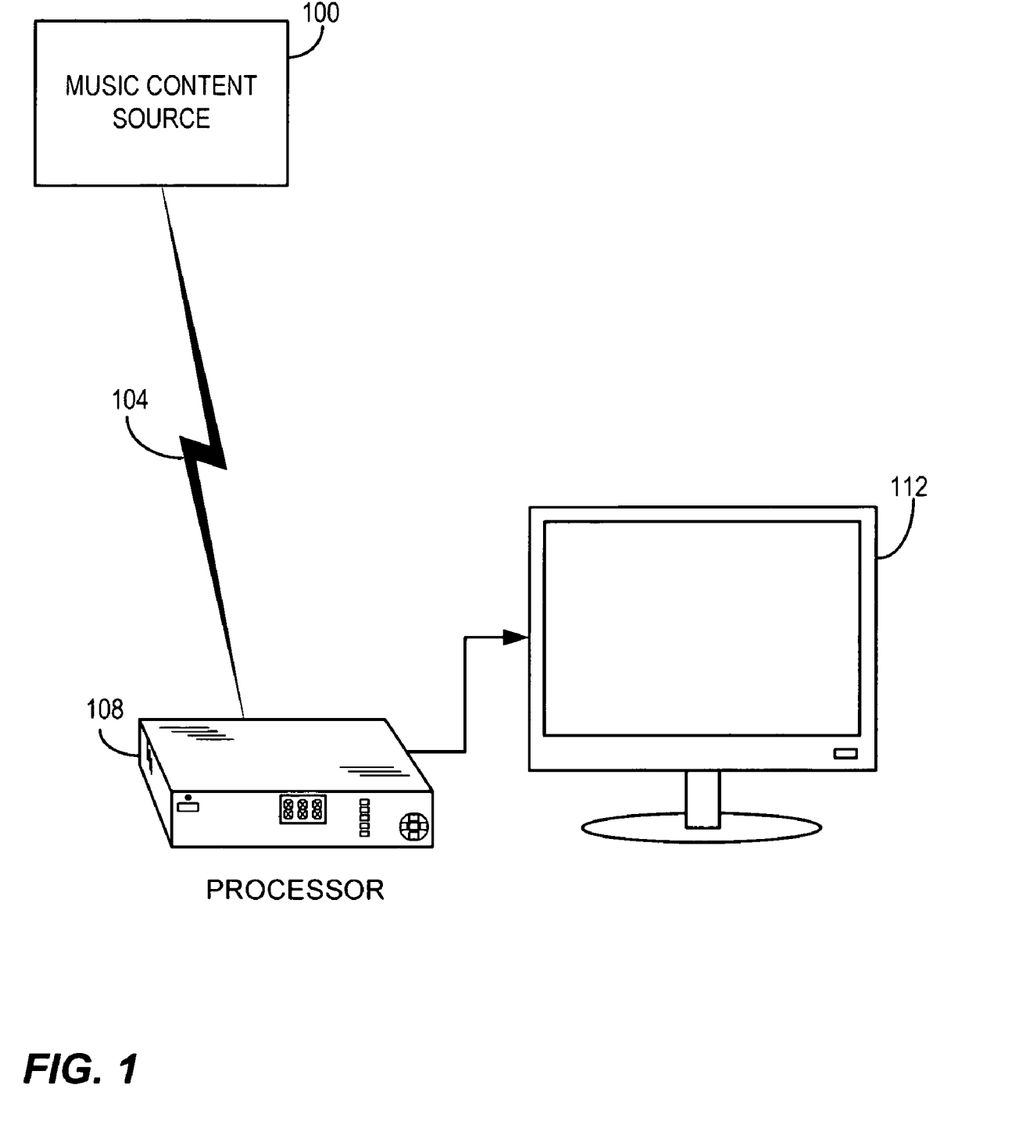
FIG. 1 is a group of control graphics consistent with certain embodiments of the present invention.

Turning now to FIG. 1, in an exemplary embodiment a music content source 100 is input to a processor 108 that is configured to execute the Interactive Music Visualizer (IMV) application. The processor 108 is communicatively connected via communication channel 104 to a display device 112 upon which the IMV application will present the IMV User Interface (UI) to a user. The music content source 100 may be any content source that inputs music selections in any suitable file or stream format for the users listening enjoyment. For example, the music content source 100 may be a CD, Internet Radio, MP3 player, iPod™ brand music player, Radio input, TV input, or any other source so configured as to provide music content that the processor may then output to a connected audio output device such as a speaker. The processor 108 may be a processor within a stand alone computer system, networked computer system, television set, or any other device configured to present both video and audio content to a user.

Figure 2:
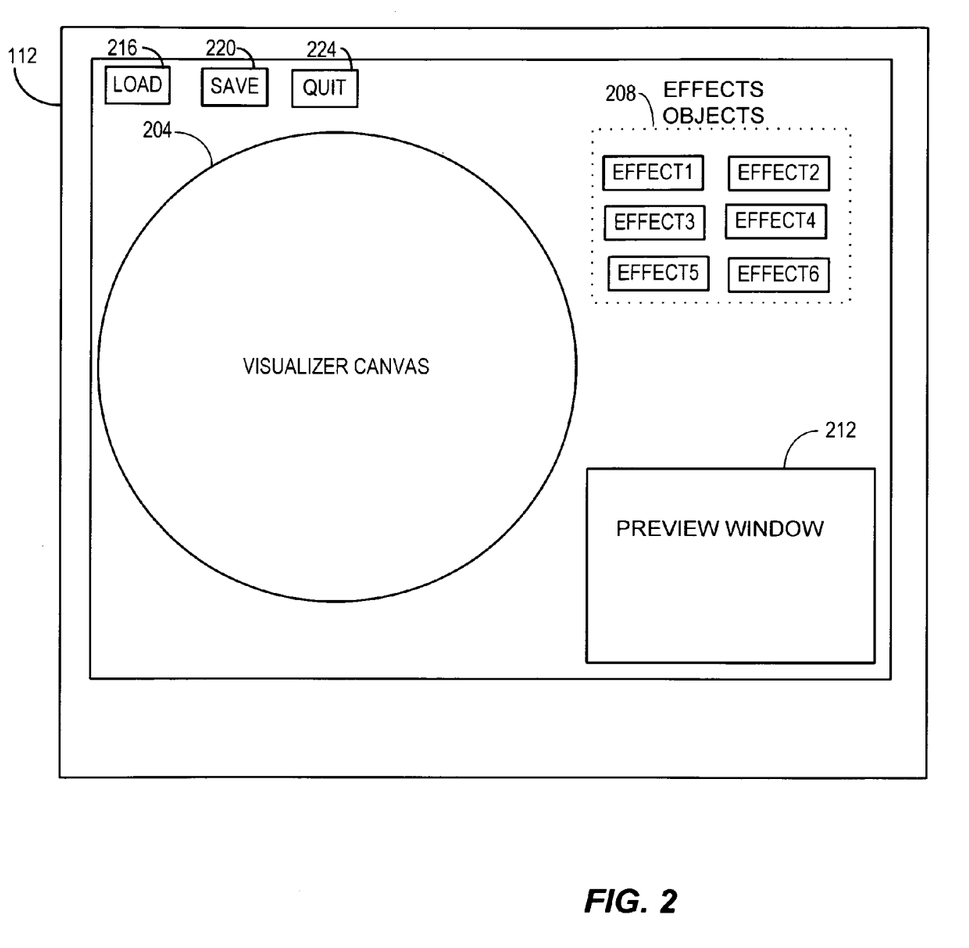
FIG. 2 is a layout of Virtual Remote Controller control graphics consistent with certain embodiments of the present invention

Turning now to FIG. 2, this figure presents an exemplary embodiment of the IMV UI as presented to a user of the system. The display device 112 is segmented in this certain embodiment into portions that may comprise a visualizer canvas 204, an effects objects area 208, and a preview window area 212. In addition, in this certain embodiment user controls are provided to allow a user to Load 216, Save 220, and Quit the application 224. The visualizer canvas 204 is the primary area for user interaction with the application. Any effect icon that is emplaced within the area presented by the visualizer canvas 204 will be detected by the action of the canvas 204 and that effect displayed within the preview window portion 212 of the UI display. The effects objects portion 208 of the UI display presents a number of effects icons that may be selected by a user for emplacement within the visualizer canvas 204 portion of the UI display. Each of these effects icons represents a different visual element, such as, by way of example, exploding fireworks, lightening, a pulsating star, and other common and/or specially produced visual elements suitable for use in a music visualizer. The user simply selects one or more of the effects icons and emplaces the icon(s) within the visualizer canvas 204 to view the effect and timing within the preview window 212.

Once the user has achieved the number and placement of all the effects icons to produce satisfactory music visualization for an input music selection, the user may select the Save 220 control on the UI display to save the configuration in memory and later recall as the user might desire. The user may also desire to input a previously saved effects icon configuration by selecting the Load 216 command, which will then provide a view of all available configurations (e.g., by name or symbol) that may be loaded to the UI display. The user may then modify or update the configuration and Save 220 it back to storage, or simply re-save the loaded configuration. The user may also select the Quit 224 command to terminate the IMV application, with or without saving the currently displayed effects icon configuration.

Figure 3:
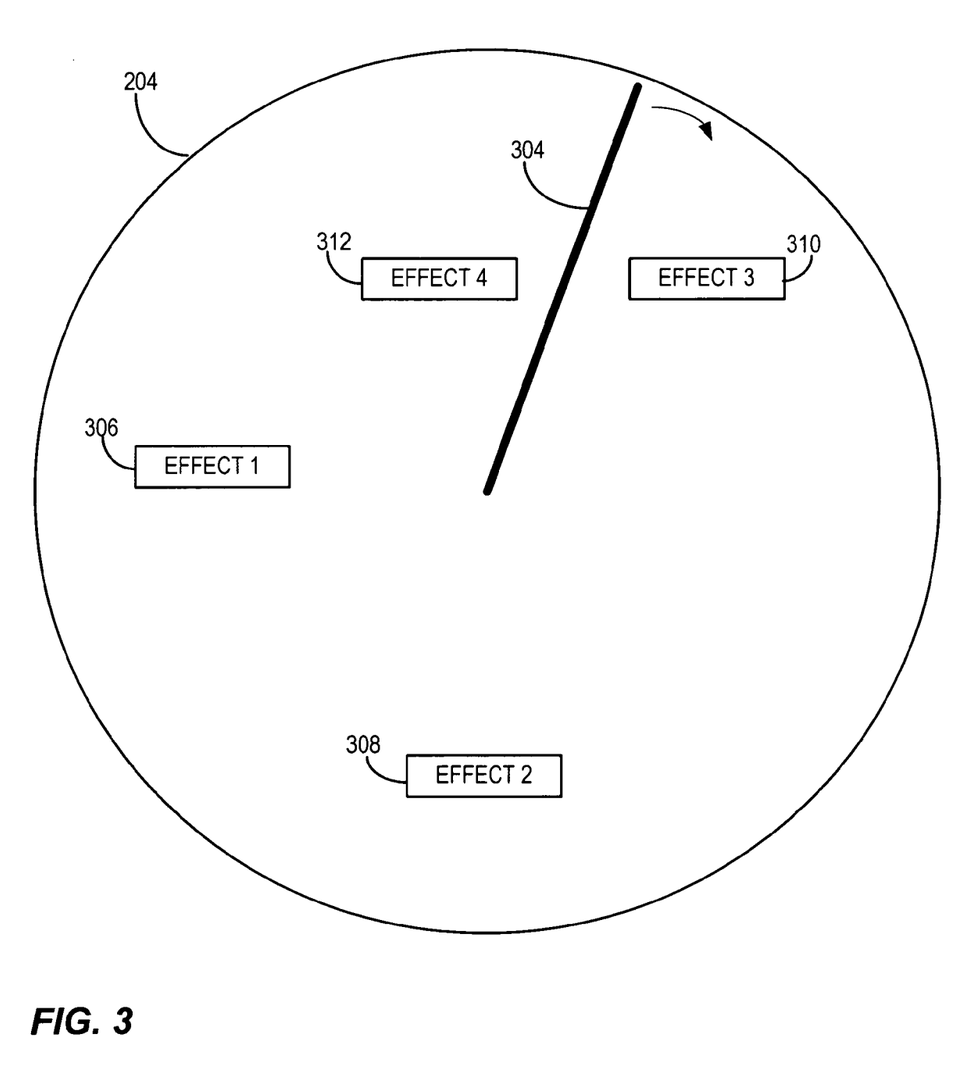
FIG. 3 is a presentation of the VRC control graphics on the screen of a video monitor consistent with certain embodiments of the present invention.

Turning now to FIG. 3, this figure presents an exemplary view of the visualizer canvas 204 section of the UI. In an exemplary embodiment, the visualizer canvas 204 is a circular area of the UI display screen upon which effects icons may be placed in order to be detected and the effect associated with the emplaced effect icon displayed in the preview window 212 section of the UI, but this should not be considered limiting. Within the visualizer canvas 204 an icon detection and timing process, the effects initializer, is represented as a sweep arm 304 that moves in a clockwise direction around the circular area of the visualizer canvas 204. The sweep arm 304 is represented as a straight line of a different color that contrasts well against the background color of the visualizer canvas 204, with one end of the sweep arm 304 located at the center of the visualizer canvas 204 and the distal end disposed toward the outer edge of the visualizer canvas 204.

In the exemplary embodiment, the sweep arm 304 moves in a clockwise (or counterclockwise in another implementation) direction with the length of the arc of motion and the speed of the motion determined by the music input. A Fast Fourier Transform (FFT) calculation is performed on the incoming music to calculate the size of the arc that will be traversed by the sweep arm 304, as well as the speed with which the sweep arm 304 will traverse the calculated arc of motion as it encounters effects 306, 308, 310 and 312. The size of the sweep arm arc is calculated as:

$$SA = 2\pi R/N$$

where SA is defined as the Size of the arc, R is defined as the radius of the visualizer canvas, and N is the Number of frequency subbands used for the FFT calculation. The speed of the sweep arm arc is calculated as:

$$SP = 2\pi R B_n / \text{min}$$

where SP is defined as the Speed of the arc, R is defined as the radius of the visualizer canvas, $B_n$ is defined as the number of beats calculated per minute from the FFT analysis of the input music, and min represents a one minute interval of time.

If a musical input is a long piece, the arc of motion (SA) will be correspondingly long, traversing more degrees of arc than a shorter piece. The sweep arm 304 may traverse the entire circular area of the visualizer canvas 204, it may travel only a portion of the way around the circle, or it may traverse the circular area more than once depending upon the length of the musical input. Likewise, the speed (SP) with which the sweep arm 304 traverses the arc of motion is dependent upon the tempo of the musical input. The motion is faster for up tempo musical numbers, and slower for musical numbers having a lower tempo.

In the exemplary embodiment, the sweep arm 304 detects icons emplaced within the circular visualizer canvas area 204 as it traverses the arc of motion. Effects icons are emplaced within the visualizer canvas 204 by a user at various locations within the canvas. The location may affect both the timing of when the effect will appear in the preview window 212 and how the effect may be represented within the preview window 212. As an example, icons emplaced near the starting point of the sweep of arc of the sweep arm 304 will display their effect nearer the beginning of the musical input, and icons emplaced further away from the starting point of the sweep of arc will display their effects closer to the end of the musical input. In addition, both the size and the placement of the effects icons may affect the representation of the associated effect within the preview window 212. As an example, an icon that is enlarged by the user from its original size when placed within the visualizer canvas 204 area will be represented by an effect that covers a correspondingly larger portion of the preview window 212, and, by extension, a larger portion of the final display area when reproduced. Making the icon smaller than its original size will result in an effect that is reduced in size on the preview window 212, and final display. The emplacement of the effects icons on the screen will also affect where on the preview window the resulting effect will appear. By way of example, an icon placed closer to the edge of the visualizer canvas 204 may appear near the top of the preview window 212, while an icon emplaced closer to the center of the visualizer canvas 204 may appear near the bottom of the preview window. In addition, there may be other operations programmed for certain portions of the visualizer canvas 204 such as a reversion zone, where icons emplaced within this zone may have the resulting effect reversed as seen in the preview window 212. Other examples may include the ability to display an effect multiple times when the user emplaces only one effect icon of that type, or performing other operations such as modification of timing or duration based upon prior operational controls that may be initiated for sections of the visualizer canvas 204.

Figure 4:
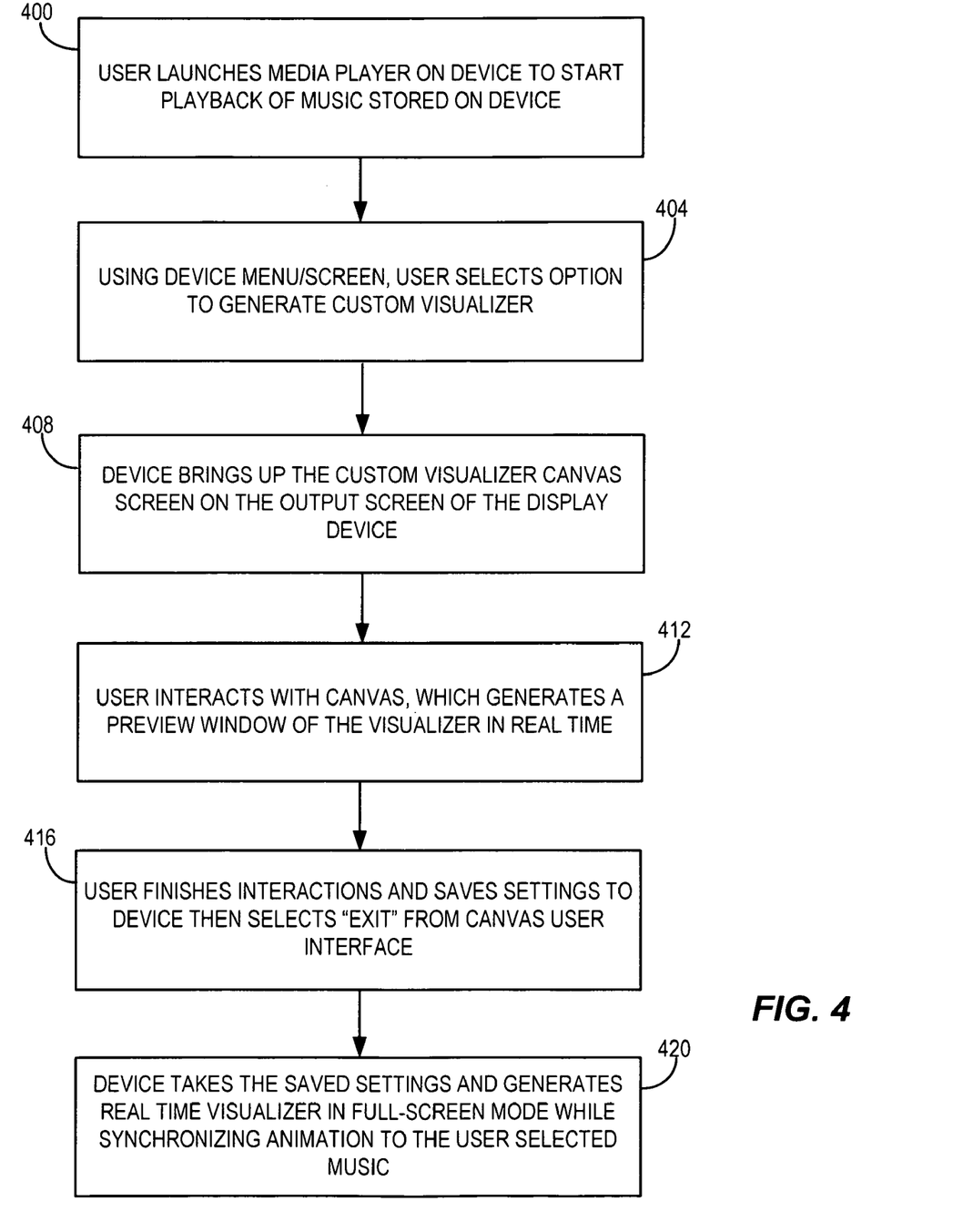
FIG. 4 is a flow layout for the VRC learning mode consistent with certain embodiments of the present invention.

Turning now to FIG. 4, this figure presents an exemplary embodiment of process flow for use of the CMV application. In this embodiment the user launches a media player process 400 which may be a device or input music feed from a live music source such as a media player, TV, MP3 player, IPOD, or the like. The user may then select the CMV application 404 from a display menu of applications available on a processor contained within any device capable of presenting audio and video content concurrently, such as, for example, a computer system, TV, game system or other dedicated audio/video device. The CMV application initializes the custom visualizer canvas 204 UI screen on the output screen of the display device associated with the processor 408. The user may then interact with the CMV UI 412 to emplace effects icons within the visualizer canvas 204 in association with an input music piece and view the resultant effects within the preview window 212. The user continues using the CMV application until satisfied with the result 416 whereupon the user may save the settings and configuration of effects within an associated storage device for later retrieval, select the "quit" command 224 to exit from CMV application UI without terminating the CMV application. The device may then load the saved settings just generated, or may provide the user with the option to select another group of settings saved earlier, and generates the real time visualizer in full-screen mode on the associated display device while synchronizing the effects animation to the user selected music at 420.

Figure 5:
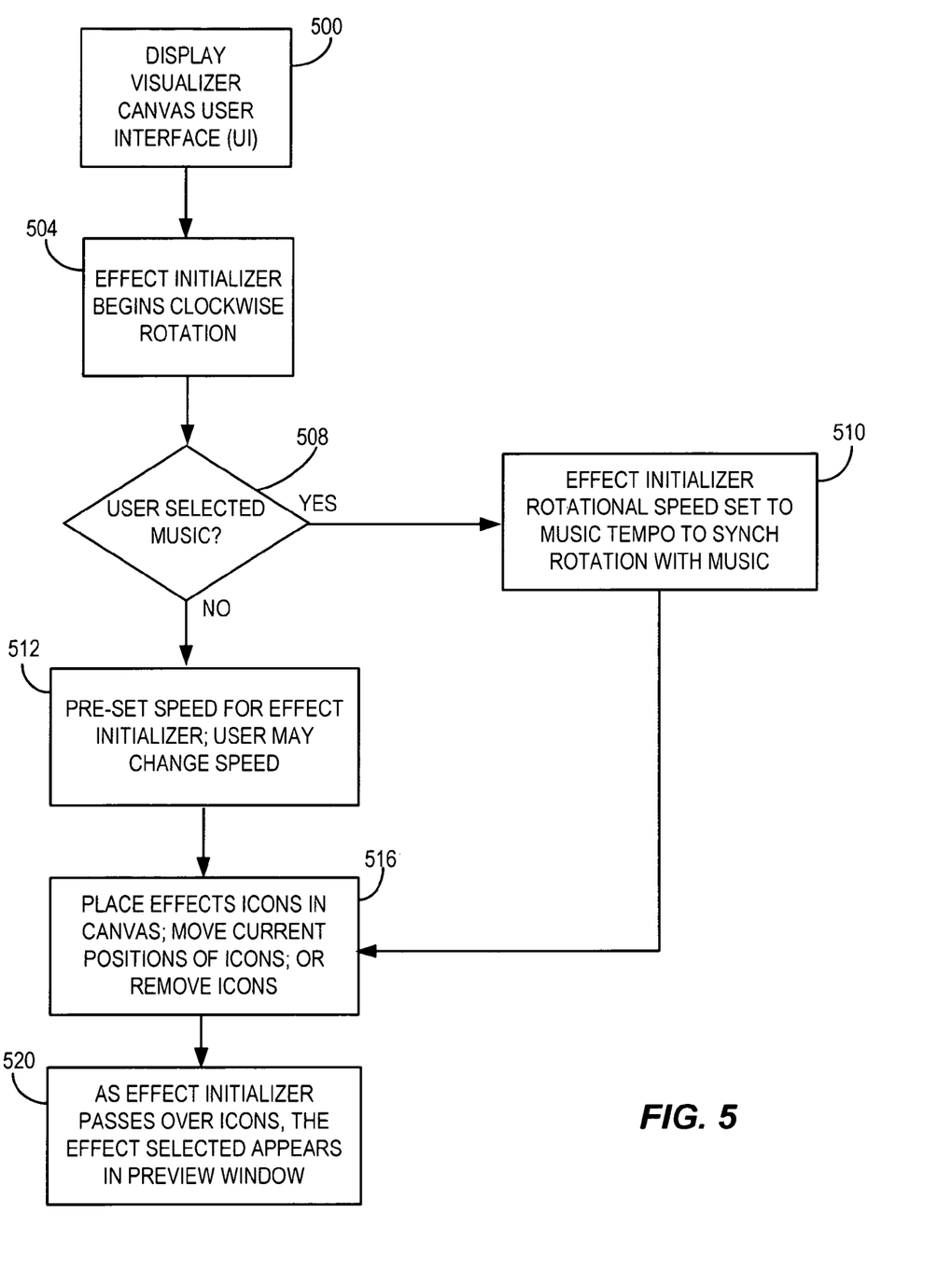
FIG. 5 is a flow layout for the VRC operation mode consistent with certain embodiments of the present invention.

Regarding FIG. 5, this figure represents an exemplary embodiment for the operation of the CMV User Interface. In this embodiment the UI is initiated by the user selection from the processor device menu display. The UI is displayed on the display device 500. The effects initializer is generated based upon pre-set initial values and begins a clockwise rotation within the visualizer canvas 504. The system determines whether an input music selection is user selected or based upon the previously stored initial values 508. If the input music selection is provided by user selection, the input music selection is sampled by the user and the Fast Fourier Transform calculation performed to determine the arc size and speed for the effects initializer sweep arm 510 to synchronize the rotation of the effects initializer with the input music selected. If no music selection is presented by the user, the effects initializer is based upon pre-set initial values. However, the user may change the speed of the arc sweep 512. The user may then begin emplacing effects icons within the visualizer canvas or the user may select to load a previously existing configuration and begin to move, add, change, or delete effects icons from the resulting configuration within the visualizer canvas 516. As the effects initializer moves over the icons within the visualizer canvas 204 the effect associated with the effect icon appears within the preview window 212 and the user may decide whether and how to change the configuration 520. When the user is satisfied with the configuration, it may be saved to a storage device by the selection of the "save" function 220, or the user may choose to "quit" 224 the UI without saving the changes.

Figure 6:
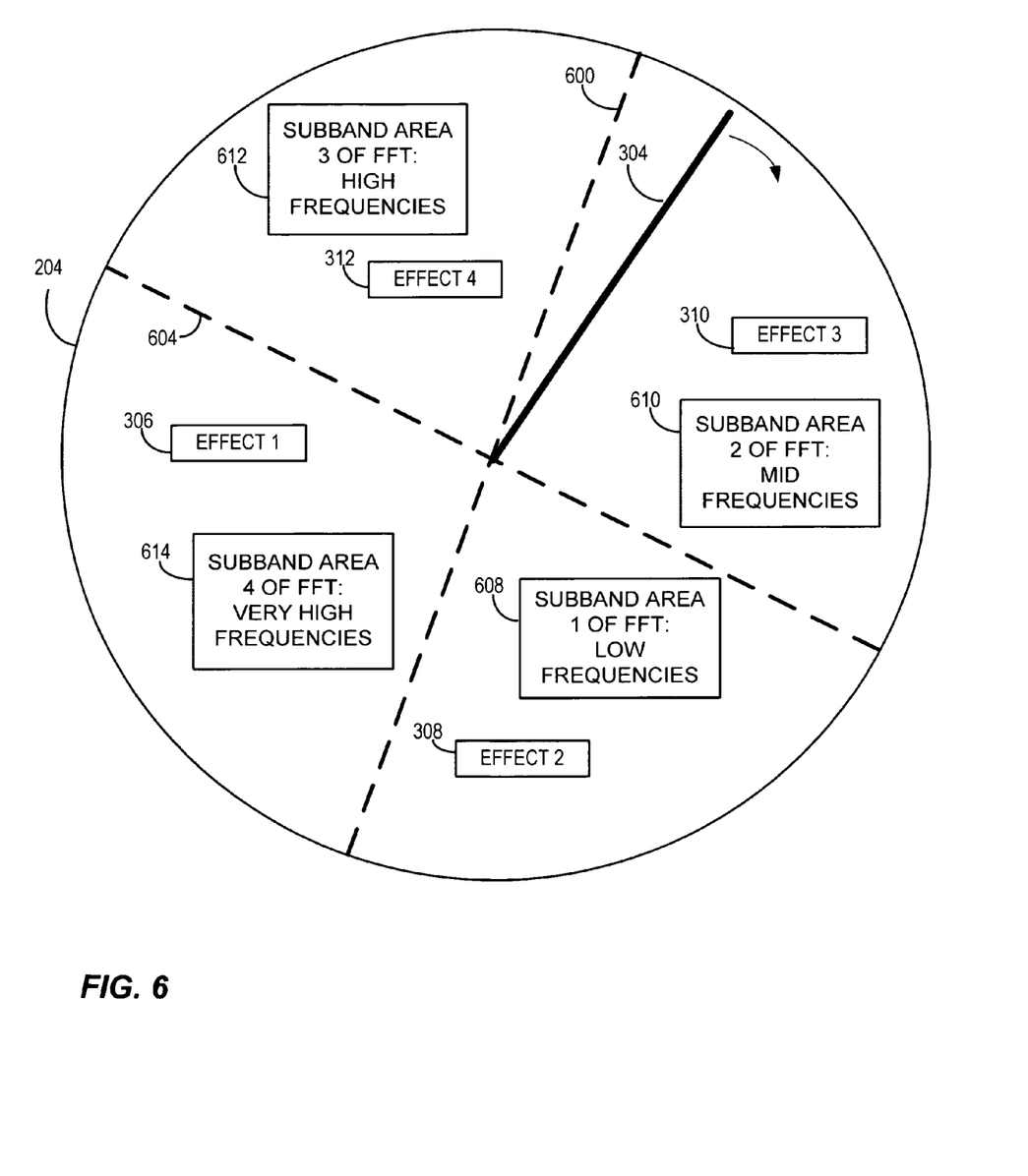
FIG. 6 is a presentation of the internal synchronization mechanism consistent with certain embodiments of the present invention.

Turning now to FIG. 6, in an exemplary embodiment this figure displays the visualizer canvas 204 as it may appear if the canvas were divided into four segments bounded by boundaries 600 and 604, each segment of which represents a subband/frequency range from an FFT calculation performed on the input musical piece. Segment 1 as calculated by the FFT analysis, by way of example, may correspond to a set of low frequencies 608, and Segment 2 as calculated by the FFT analysis may correspond to a set of mid-range frequencies 610. This process is repeated for segments that correspond to high frequencies 612 and very high frequencies 614. In this manner, the visualizer canvas 204 is fully segmented into frequency ranges within which a user may emplace desired visualizer effects (306, 308, 310, 312). Upon detection of a beat of the music in which a particular frequency or range of frequencies is active, the sweep arm determines which effects are within those segments that are active and generates the particular effect represented by the effect icon that is located within the frequency range segment. Although this figure presents a segmentation of the visualizer canvas into four frequency ranges, this figure should in no way be considered limiting. In further representative examples the FFT calculation could readily segment the visualizer canvas into a higher number of segments, each representing a narrower range of frequencies within the range of human hearing. A typical example might segment the visualizer canvas into 32 or 64 segments to provide a more complex and interesting visual display as many more effects may be emplaced and activated based upon the higher number of frequency segments available.

Figure 7:
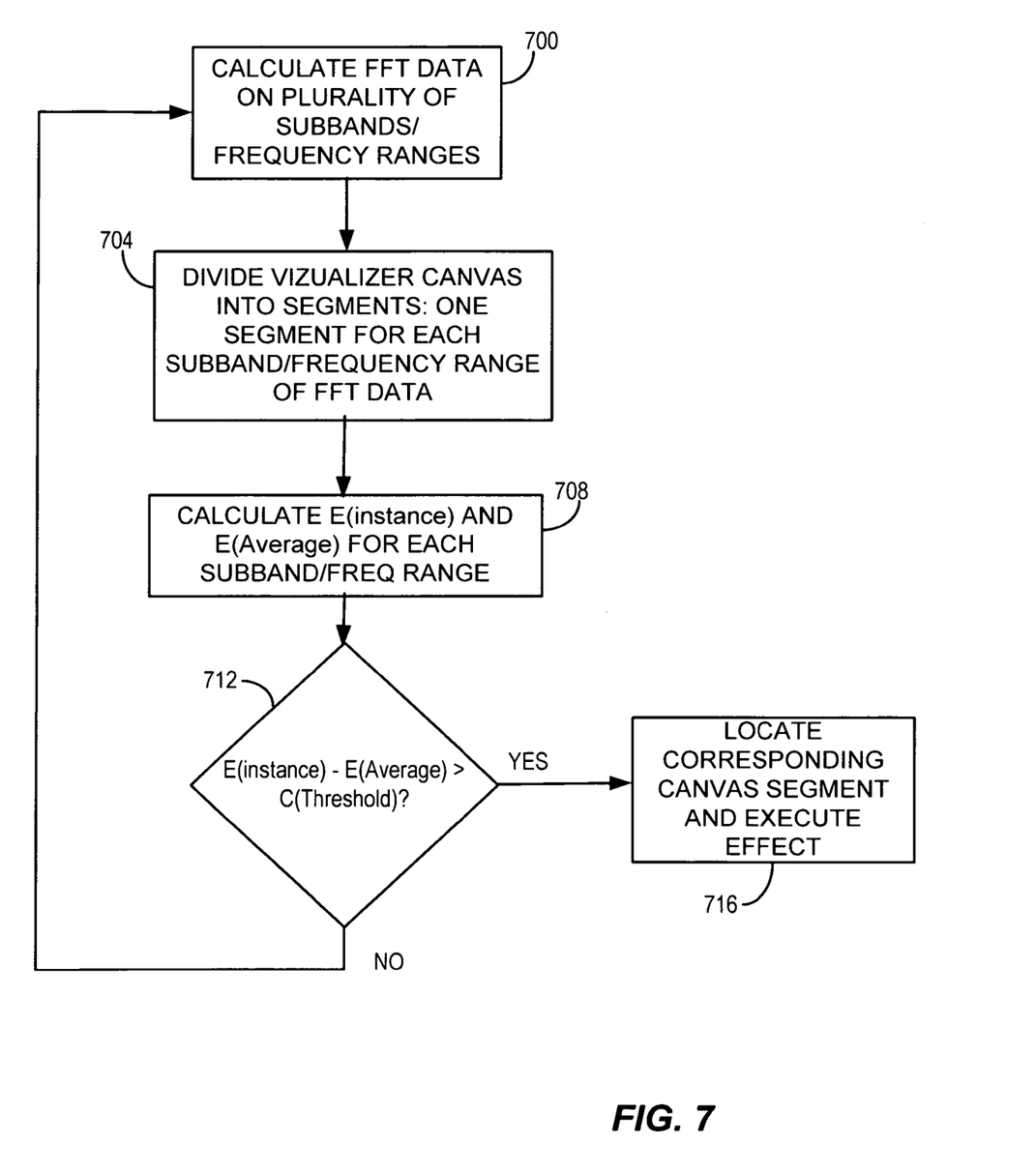
FIG. 7 is a flow layout for the internal synchronization mechanism using FFT data consistent with certain embodiments of the present invention.

Turning now to FIG. 7, in an exemplary embodiment this figure presents the internal synchronization of the segmentation of the visualizer canvas 204 using an FFT Algorithm calculation. Initially, an FFT calculation is performed to segment the incoming music data into a pre-selected plurality of segments 700. Each segment produced represents a group of frequencies of the range of human hearing, with the number of segments in a non-limiting example initially set to 32 or 64 frequency segments. The visualizer canvas is then divided into the pre-selected number of segments and a frequency range from the FFT calculation associated with each segment of the canvas 704. An FFT algorithm then performs a calculation upon each detected beat of the incoming music to determine the Energy value for that beat instance ($E_{instance}$) and the Energy value average from a Sample History Buffer ($E_{average}$) for each frequency range 708. To determine the segments in which emplaced effects will be activated, the following calculation is performed at 712:

$$E_{instance} - E_{average} > C_{(threshold)}$$

If the calculation is true for a given frequency range, then the method locates each corresponding visualizer canvas 204 segment for which the calculation is true and executes the effect at 716 that has been emplaced within that segment of the visualizer canvas 204. If the calculation is not true for a given frequency range, then those segments represented by such a given frequency range will not be active and the effects emplaced within those segments will not be executed for that particular beat of the music performance.

Thus, this document describes a method and system for creating customized music visualizations through initializing a user interface for user interaction. The user interface presents a user with a plurality of effects icons, each icon of which represents a different visual effect upon a visualizer canvas as a portion of the user interface display upon which the user can emplace one or more of the visual effects icons. The icon locations and configuration of each emplaced visual effect icon are detected within the visualizer canvas area, with the visual effect represented by each visual effect icon displayed as it is detected in a preview window portion of the user interface display separate from the visualizer canvas. The visual effect icon detection may be adjusted such that the presentation of the visual effects is synchronized to a musical selection input, and the resulting effects presentation saved as the plurality of selected visual effects icons within a configuration file that is written to a storage device.

In certain implementations, variations such as the following may be implemented. The UI further has at least a visualizer canvas portion, a presentation portion, an effects icon presentation portion, and a plurality of user command button icons. The visualizer canvas portion has a circular area for the emplacement of effects icons, the presentation portion is active to display video effects upon detection of video effects icons in the visualizer canvas portion of the user interface, and the effects icon presentation portion has a plurality of video effects icons, each icon of which represents a video effect that may be displayed either in the presentation portion of the user interface display, or upon a full display screen area.

The detection of video effects icons within the visualizer canvas can be performed by an effects initializer that may have a sweep arm that travels in a counterclockwise direction through an arc and at a speed determined by a musical input. Each effect icon is detected when the sweep arm impacts the location of the video effect icon within the visualizer canvas. The length of the arc described by the sweep arm and the speed of the sweep arm are determined by performing a Fast Fourier Transform calculation on a musical input, the arc length and speed being proportional to the calculation result. The configuration of the location of video effects icons, as well as adjustments to the synchronization with a musical selection input may be stored as a single configuration file to be recalled later for use or modification with command button icons available upon the UI screen for performing these tasks.

The above overviews are intended to illustrate exemplary embodiments which will be best understood in conjunction with the detailed description to follow, and are not intended to limit the scope or meaning of the appended claims.

While certain illustrative embodiments have been described, it is evident that many alternatives, modifications, permutations and variations will become apparent to those skilled in the art in light of the foregoing description.

What is claimed is:

1. A method for creating customized music visualizations, comprising:
   initializing a user interface for user interaction;
   presenting a user with a plurality of effects icons, each icon of which represents a different visual effect;
   presenting a visualizer canvas as a portion of the user interface display;
   responsive to a user interaction emplacing one or more of the visual effects icons on the visualizer canvas;
   detecting a location and a configuration of each emplaced visual effect icon within the visualizer canvas;
   displaying the visual effect represented by each visual effect icon as it is detected in a portion of the user interface display separate from the visualizer canvas;
   adjusting the visual effect icon detection such that the presentation of the visual effects is synchronized to a musical selection input; and
   saving the plurality of selected visual effects icons configuration in a file within a storage device, and
   where the detection of video effects icons within the visualizer canvas is performed by an effects initializer that comprises a sweep arm that travels in a continuous sweeping motion through an arc and at a speed determined by a musical input, and where each effect icon is detected when the sweep arm impacts the location of the video effect icon within the visualizer canvas, and where the length of the arc described by the sweep arm and the speed of the sweep arm are determined by performing a Fast Fourier Transform calculation on a musical input to produce a calculation result, the arc length and speed being proportional to the calculation result.

2. A method as in claim 1, where the user interface comprises at least a visualizer canvas portion, a presentation portion, an effects icon presentation portion, and a plurality of user command button icons.

3. A method as in claim 2, where the visualizer canvas portion comprises a circular area for the emplacement of effects icons.

4. A method as in claim 3, the visualizer canvas is segmented into a plurality of sections corresponding to discrete frequency ranges as calculated by a Fast Fourier Transform algorithm.

5. A method as in claim 2, where the presentation portion is active to display video effects upon detection of video effects icons in the visualizer canvas portion of the user interface.

6. A method as in claim 2, where the effects icon presentation portion comprises a plurality of video effects icons, each icon of which represents a video effect that is displayed either in the presentation portion of the user interface display, or upon a full display screen area when emplaced on the visualizer canvas portion.

7. A method as in claim 1, where the configuration of the location of video effects icons and adjustments to the synchronization with a musical selection input are stored as a single configuration file.

8. A system for creating customized music visualizations, comprising:
  a processor;
  a module operative to initiate a user interface process, a user interface display initialized by the user interface process comprising at least a video effects portion, a preview window portion, and a visualizer canvas portion;
  a module operative to process interaction with a user, wherein interaction comprises emplacement of video effects icons within the visualizer canvas portion;
  a module operative to detect the location and configuration of each emplaced visual effect icon within the visualizer canvas portion, and to display the visual effects upon detection within the preview window portion of the user interface display, where detection of the location and configuration of the video effects icons within the visualizer canvas portion is performed by an effects initializer that comprises a sweep arm that travels in a continuous sweeping motion through an arc and at a speed determined by a musical input, and where each effect icon is detected when the sweep arm impacts the location of the video effect icon within the visualizer canvas portion;
  a module operative to adjust the visual effect icon detection such that the presentation of the visual effects is synchronized to a musical selection input; and a storage device upon which configuration files containing the emplaced video effect selection and detection parameters are stored,
  and where the length of the arc described by the sweep arm and the speed of the sweep arm are determined by performing a Fast Fourier Transform calculation on a musical input to produce a calculation result, the arc length and speed being proportional to the calculation result.

9. A system as in claim 8, where the visualizer canvas portion of the user interface display comprises a circular area that further comprises an effects initializer process.

10. A system as in claim 9, where the sweep arm travels in a counterclockwise direction through the arc.

11. A system as in claim 9, where configuration files containing the location of video effects icons and adjustments to the synchronization of the effects initializer sweep arm with a musical selection input are stored in the storage device.

12. A system as in claim 9, where the visualizer canvas area is segmented into a plurality of sections corresponding to discrete frequency ranges as calculated by a Fast Fourier Transform algorithm.

13. A system as in claim 8, where the preview window portion is operative to display the video effect represented by each video effect icon as it is detected by the effects initializer.

14. A system as in claim 8, where the video effects portion of the user interface display is operative to display a plurality of video effects icons that may be selected by the user for emplacement within the visualizer canvas portion of the user interface display.

15. A non-transitory computer-readable storage medium having computer-executable instructions for performing a method for creating customized music visualizations, comprising:
  initializing a user interface for user interaction;
  presenting a user with a plurality of effects icons, each icon of which represents a different visual effect;
  presenting a visualizer canvas as a portion of the user interface display;
  responsive to a user interaction, emplacing one or more of the visual effects icons on the visualizer canvas;
  detecting a location and a configuration of each emplaced visual effect icon within the visualizer canvas;
  displaying the visual effect represented by each visual effect icon as it is detected in a portion of the user interface display separate from the visualizer canvas;
  adjusting the visual effect icon detection such that the presentation of the visual effects is synchronized to a musical selection input; and
  saving the plurality of selected visual effects icons configuration in a file within a storage device, and
  where the detection of video effects icons within the visualizer canvas is performed by an effects initializer that comprises a sweep arm that travels in a continuous sweeping motion through an arc and at a speed determined by a musical input, and where each effect icon is detected when the sweep arm impacts the location of the video effect icon within the visualizer canvas, and where the length of the arc described by the sweep arm and the speed of the sweep arm are determined by performing a Fast Fourier Transform calculation on a musical input to produce a calculation result, the arc length and speed being proportional to the calculation result.

16. A non-transitory computer-readable storage medium as in claim 15, where the user interface comprises at least a visualizer canvas portion, a presentation portion, an effects icon presentation portion, and a plurality of user command button icons.

17. A non-transitory computer-readable storage medium as in claim 16, where the visualizer canvas portion comprises a circular area for the emplacement of effects icons.

18. A non-transitory computer-readable storage medium as in claim 17, where the visualizer canvas is segmented into a plurality of sections corresponding to discrete frequency ranges as calculated by a Fast Fourier Transform algorithm.

19. A non-transitory computer-readable storage medium as in claim 16, where the presentation portion is active to display video effects upon detection of video effects icons in the visualizer canvas portion of the user interface.

20. A non-transitory computer-readable storage medium as in claim 16, where the effects icon presentation portion comprises a plurality of video effects icons, each icon of which represents a video effect that is displayed either in the presentation portion of the user interface display, or upon a full display screen area when emplaced on the visualizer canvas.

21. A non-transitory computer-readable storage medium as in claim 15, where the detection of video effects icons within the visualizer canvas is performed by an effects initializer.

22. A non-transitory computer-readable storage medium as in claim 21, where the sweep arm travels in a counterclockwise direction.

23. A non-transitory computer-readable storage medium as in claim 22, where the length of the arc described by the sweep arm and the speed of the sweep arm as determined by the Fast Fourier Transform calculation on a musical input are proportional to the calculation result.

24. A non-transitory computer-readable storage medium as in claim 15, where the configuration of the location of video effects icons, as well as adjustments to the synchronization with a musical selection input are stored as a single configuration file.

25. A method for creating a customized music visualization display for a music input, comprising:
    initializing a user interface display upon a display device for user interaction;
    presenting a user with a plurality of effects icons, each icon of which represents a different visual effect for display;
    presenting a visualizer canvas as a portion of the user interface display;
    responsive to a user interaction emplacing one or more of the visual effects icons on the visualizer canvas;
    detecting a location and a configuration of each emplaced visual effect icon within the visualizer canvas;
    displaying the visual effect represented by each visual effect icon as it is detected in a portion of the user interface display separate from the visualizer canvas;
    adjusting the visual effect icon detection such that the presentation of the visual effects is synchronized to a musical selection input, and
    where the detection of the location and configuration of each video effect icon within the visualizer canvas is performed by an effects initializer that comprises a sweep arm that travels in a continuous sweeping motion through an arc and at a speed determined by a musical input, and where each effect icon is detected when the sweep arm impacts the location of the video effect icon within the visualizer canvas, and where the length of the arc described by the sweep arm and the speed of the sweep arm are determined by performing a Fast Fourier Transform calculation on a musical input to produce a calculation result, the arc length and speed being proportional to the calculation result.

26. A method as in claim 25, where the user interface display comprises at least a visualizer canvas display portion, a presentation display portion, an effects icon presentation display portion, and a plurality of user command button icons.

27. A method as in claim 26, where the visualizer canvas display portion comprises a circular area for the emplacement of effects icons.

28. A method as in claim 27, where the visualizer canvas display area is segmented into a plurality of sections corresponding to discrete frequency ranges as calculated by the Fast Fourier Transform algorithm.

29. A method as in claim 26, where the presentation display portion is active to display video effects upon detection of video effects icons in the visualizer canvas portion of the user interface.

30. A method as in claim 26, where the effects icon presentation display portion comprises a plurality of video effects icons, each icon of which represents a video effect that is displayed either in the presentation portion of the user interface display, or upon a full display screen area when emplaced on the visualizer canvas.

31. A method as in claim 25, where the detection of video effects icons within the visualizer canvas display is performed by an effects initializer.

* * * * *